US012010266B2

(12) United States Patent
Nahamoo et al.

(10) Patent No.: US 12,010,266 B2
(45) Date of Patent: Jun. 11, 2024

(54) RECORDING EVIDENCE OF COMMUNICATION IN HUMAN-MACHINE INTERACTIONS

(71) Applicant: Pryon Incorporated, Raleigh, NC (US)

(72) Inventors: David Nahamoo, Great Neck, NY (US); Igor Jablokov, Raleigh, NC (US); Clifford A. Pickover, Yorktown Heights, NY (US)

(73) Assignee: Pryon Incorporated, Raleigh, NC (US)

( * ) Notice: Subject to any disclaimer, the term of this patent is extended or adjusted under 35 U.S.C. 154(b) by 0 days.

(21) Appl. No.: 16/445,907

(22) Filed: Jun. 19, 2019

(65) Prior Publication Data

US 2019/0385256 A1    Dec. 19, 2019

Related U.S. Application Data

(60) Provisional application No. 62/687,171, filed on Jun. 19, 2018.

(51) Int. Cl.
*G06Q 50/18* (2012.01)
*G06F 16/27* (2019.01)
*G06Q 10/0635* (2023.01)
*H04L 43/08* (2022.01)
*H04L 67/141* (2022.01)
*H04M 3/493* (2006.01)
*G06F 40/20* (2020.01)

(52) U.S. Cl.
CPC ............ *H04M 3/493* (2013.01); *G06F 16/27* (2019.01); *G06Q 10/0635* (2013.01); *G06Q 50/182* (2013.01); *H04L 43/08* (2013.01); *H04L 67/141* (2013.01); *G06F 40/20* (2020.01)

(58) Field of Classification Search
CPC ... H04M 3/493; H04M 3/42221; G06F 16/27; G06F 40/20; G06Q 20/401; G06Q 20/0655; G06Q 30/0281; G06Q 10/0635; G06Q 50/182; H04L 43/08; H04L 67/141
USPC .......................................................... 705/80
See application file for complete search history.

(56) References Cited

U.S. PATENT DOCUMENTS 10,181,948 B1 *   1/2019   Nenov ................ G06F 9/44505
10,706,839 B1 *   7/2020   Stephenson ........... H04M 3/493
(Continued)

FOREIGN PATENT DOCUMENTS

CN       107180350 A       9/2017
JP       2004-172694 A     6/2004
(Continued)

OTHER PUBLICATIONS

Convering Blockchain and Voice Recording: A New Horizon in the Financial Compliance Space, Mar. 19, 2018 [retreived from the internet (May 26, 2019): https://www.verba.com/compliance-blockchain-voice-recording/].
(Continued)

*Primary Examiner* — Mohamed A. Wasel
(74) *Attorney, Agent, or Firm* — Occhiuti & Rohlicek LLP

(57) ABSTRACT

Machine-implemented assistance is provided in interaction among multiple parties. This assistance can include recording of evidence of communication, and in particular to recording of evidence of language-based communication between humans and machines. Further, machine-implemented facilitation of dispute resolution based on the recorded evidence may be provided.

21 Claims, 2 Drawing Sheets

(56) References Cited

U.S. PATENT DOCUMENTS

| | | | |
|---|---|---|---|
| 2008/0187109 A1 | 8/2008 | Meng et al. | |
| 2008/0255886 A1* | 10/2008 | Unkefer | G06Q 40/08 705/78 |
| 2011/0206198 A1 | 8/2011 | Freedman et al. | |
| 2015/0046341 A1* | 2/2015 | Cheng | G06Q 30/0281 705/304 |
| 2016/0086169 A1* | 3/2016 | Jodoin | G06Q 20/385 705/66 |
| 2016/0239805 A1* | 8/2016 | Geffen | G10L 13/08 |
| 2017/0243287 A1* | 8/2017 | Johnsrud | G06Q 20/02 |
| 2017/0277993 A1* | 9/2017 | Beaver | G06Q 30/0201 |
| 2018/0018723 A1* | 1/2018 | Nagla | H04L 63/08 |
| 2018/0114154 A1* | 4/2018 | Bae | G06Q 10/067 |
| 2018/0205555 A1* | 7/2018 | Watanabe | H04L 9/3226 |
| 2018/0239959 A1* | 8/2018 | Bui | G06F 40/103 |
| 2019/0104092 A1* | 4/2019 | Koohmarey | H04L 51/18 |
| 2020/0014642 A1* | 1/2020 | Sidi | G06Q 30/0633 |
| 2020/0250676 A1* | 8/2020 | Sierra | H04L 9/302 |

FOREIGN PATENT DOCUMENTS

| | | |
|---|---|---|
| JP | 2007-503754 A | 2/2007 |
| JP | 2007-135120 A | 5/2007 |
| JP | 2009-014888 A | 1/2009 |
| JP | 2009-055376 A | 3/2009 |
| JP | 2017-220710 A | 12/2017 |
| WO | 2018056450 A1 | 3/2018 |

OTHER PUBLICATIONS

Stephen Thompson: "The preservation of digital signatures on the blockchain", May 17, 2017 (May 17, 2017), XP055437955, DOI: 10.1049/iet-ifs.2011.0344 Retrieved from the Internet: URL:http://ojs.library.ubc.ca/index.php/seealso/article/download/188841/186525 [retrieved on Jan. 3, 2018].

* cited by examiner

RECORDING EVIDENCE OF COMMUNICATION IN HUMAN-MACHINE INTERACTIONS

CROSS-REFERENCE TO RELATED APPLICATIONS

This application claims the benefit of U.S. Provisional Application No. 62/687,171 filed Jun. 19, 2018, which is incorporated herein by reference.

BACKGROUND

This invention relates to assistance of interaction among a plurality of parties including recording of evidence of communication, and in particular to recording of evidence of language-based communication between humans and machines, and machine-implemented facilitation of dispute resolution based on the recorded evidence.

Agreements between parties form the basis of commercial activity. In such agreements, for example, in agreements between two parties (recognizing that more than two parties may be involved in a single agreement) each party agrees to perform some action (or refrain from some action) in exchange for the other party performing another action. For example, one party (e.g., a "customer") agrees to pay an agreed amount of money at a particular future time in exchange for the other party (e.g., a "service provider") performing a specified service. Should there be a dispute, for example, as to whether the agreed amount of money was paid or the specified service performed, or even as to whether an agreement was entered into in the first place, the parties rely on evidence of the agreement. Examples of evidence may include, for example, a copy of a check provided in payment to the service provider, a written proposal (e.g., on the company's letterhead) provided to the customer specifying the nature of the service to be performed. In some cases, a formal contact may have been drawn up, signed by both parties, and possibly witnessed by another party or a notary, with each party retaining a copy. If the parties cannot resolve the dispute among themselves, an arbitrator, typically a third party such as a judge, may consider the available evidence and determine whether the agreement was made (e.g., was there indeed a requisite "meeting of the minds" consistent with an intent to form a contract) and whether the terms of the contract were carried out. Although evidence of formation and/or execution of an agreement is important for dispute resolution, there may be other reasons for retaining such evidence, including for example, government regulatory requirements. Note that in the discussion below, the term "agreement" is used to encompass various forms including formal contracts, promises, offers, etc., without intending to incorporate any particular legal distinction or connotation to the term.

Some evidence is preserved and made public, for example to make it more difficult for parties to repudiate the existence of an agreement or to serve a government purpose. An example of such a case is recordation of deeds transferring real property. A registry of deeds is considered to be an immutable record of transfers of property or other agreements related to property (e.g., mortgages). In some cases, the registry provides a proof of the existence of an agreement but not the specific terms (e.g., a promissory note is not generally recorded with the mortgage).

With the evolution of non-written communication in the formation of agreements, for example, with voice communication at a distance, such as over a telephone network, retention of evidence of agreements became more difficult. Common techniques that many have encountered include being provided with a reference identifier (e.g., a "confirmation number") by a telephone call agent with the understanding that the substance of a phone interaction is being saved in association with that identifier by the company; recording of an entire telephone interaction to satisfy regulatory requirements (e.g., for certain telephone-initiated financial transactions); or mailing of a written confirmation of phone conversation to memorialize the call. Many people have nevertheless had the experience that the existence of a call-based agreement may be disputed by a company, or the terms of what was agreed to does not match the person's recollection.

Today, people may interact with computer-implemented agents rather than human agents. For example, a person may call a travel reservation service to book a flight or a hotel room and be served by a computer using automated speech recognition and natural language understanding. As another example, with the proliferation of text messaging (e.g., by users via their smartphones) computer-based agents (e.g., "bots", short for robots) may engage in multiple-turn interactions with a user to establish an agreement. Although a user may retain a copy of a text exchange as evidence, such a copy does not necessarily provide aspects of non-repudiation that may be provided, for example, by a signature or a written document on the company's letterhead. As a possibly more common example, countless agreements are made via text-based computer interactions via "web" browsers and servers (e.g., text or hypermedia interactions between client and server computers, such as using what is referred to as the "World-Wide Web").

In recent years, techniques have been developed to maintain a distributed ledger that records transactions between two parties efficiently and in a verifiable and permanent way, with perhaps the best-known of such distributed ledgers being the Blockchain. Blockchain provides an immutable record of the existence of a set of sequential transactions. Specific types of transactions related to exchange of virtual currencies such as Bitcoin are built on top of the distributed ledger capabilities of Blockchain. However, such distributed ledgers may be used for other types of transactions. For example, in an analogy to a registry of deeds, copies of documents may be stored (publicly or privately) and a non-invertible digest of the document is entered in a transaction in the distributed ledger. Because the digest is in the immutable ledger, a party with a copy of the underlying document can prove the prior existence of the document based on the existence of the transaction in the ledger. Various types of documents or recordings can be handled in this way. In the discussion below, the term "immutable ledger" is used to refer to any sort of physical or electronic ledger, distributed or centralized, which may be used to maintain a proof of existence of transactions or other entries in the ledger, and the term should not be construed to be limited to Blockchain or to imply characteristics of any particular distributed ledger system.

SUMMARY

In a general aspect, embodiments described in this document address a problem of recording of evidence of communication with a particular focus on recording of evidence of communication between humans and machines, for example, for use in dispute resolution. One focus is on language-based communication (e.g., natural speech, text messaging) between a person (or more generally one or more people) and a computer-implemented agent (referred to below as an "AI agent"). A technical problem that is addressed by at least some of the embodiments is that it may not be feasible to record the entirety of all interactions for a person or an automated system (e.g., due to storage requirements, and difficulty of later identifying pertinent evidence), and therefore a determination is made as to when an agreement is being made and only a selected part of an interaction is recorded as evidence, for example, in an immutable ledger. The act of recording the evidence may be undertaken on behalf of any one of the parties in an interaction (e.g., in an application monitoring voice interactions on a user's smartphone), on behalf of both of the parties (e.g., as service provided to the parties), or even independently of either of the parties (if indeed legally permitted).

In one aspect, in general, a method for recording evidence of an agreement made in communication includes monitoring communication between a plurality of parties. The plurality of parties includes a user and an agent and the communication includes at least some part related to the forming of an agreement between at least some of the parties. A machine-implemented process is used to form evidence of the agreement based on the monitoring of the communication. The evidence is then stored in an immutable ledger for future retrieval, for example, for future resolution of a dispute related to the agreement.

In some embodiments, a machine-implemented party, referred to below as an "interaction assistant," participates in the interaction between the person and the AI agent. In addition to passively monitoring the communication between the human and the AI agent and recording the evidence of the interaction, the interaction assistant may interject (i.e., intercede or intervene in the interaction between the human and the AI agent) or have side interactions with the person for various reasons including to reconcile perceived differences in understanding between the human and the agent (the "meeting of the minds"), elicit confirmation of the understanding, or advise the human regarding the interaction, for example, advising the human than they may want to consult an attorney or otherwise seek legal advice.

In some embodiments, the interaction assistant may facilitate additions of parties to the communication between the human and the AI agent. For example, in addition to recommending that the human solicit legal advice, the interaction assistant may cause a human or machine-implemented legal advisor to join the communication and enable the human to have a side conversation with the legal advisor independently of the human's communication with the AI agent.

In another aspect that is related to the recording of evidence of the communication, a machine-implemented dispute assistant has access to the evidence and conducts an interaction between the human and a representative of the entity originally represented by the AI agent to resolve a disagreement regarding the substance of the original communication. In some examples, the dispute resolver includes a machine-implemented question answering system, which uses the stored evidence as the basis for the answers. That is, the parties can interrogate the dispute resolver to recover specific items of evidence that resolve the dispute. In some examples, the dispute assistant facilitates the addition of additional human or machine-implemented participants in the dispute resolution interaction.

In another aspect, in general, a method for machine-implemented assistance of interaction among a plurality of parties includes monitoring of communication among the plurality of parties. The plurality of parties may include a user and an agent, and the communication includes at least some part related to forming of an agreement between at least some of the parties (e.g., between the user and the agent). The method further includes forming, using a machine-implemented process, evidence of the agreement based on the monitoring of the communication. The evidence is then stored in an immutable ledger (e.g., on the public Blockchain) for future retrieval.

Aspects may include one or more of the following features.

Forming the evidence comprises performing a natural language processing analysis of the communication to extract the evidence.

Forming the evidence includes using the machine-implemented process to perform one or more of the following: determining that the communication relates to forming the agreement; determining the part of the communication that relates to forming the agreement; determining a degree or importance or risk associated to the agreement; extracting information characterizing the agreement; eliciting clarification or confirmation information from the parties; and determining confidence of information determined or extracted from the communication.

The communication is between a human user and a machine-implemented agent.

The communication is between two human users.

The monitoring and the forming of evidence is performed without interjection in the communication between the parties.

The method further includes conducting a machine-implemented interaction between a monitoring entity and one or more of the plurality of parties.

This conducted interaction includes one or more of: providing advice to at least one party of the plurality of parties; establishing communication between at least one party of the plurality of parties and a further party for the purpose of advising said party; and answering questions received from at least party of the plurality of parties related to the interaction among the parties or a prior related interaction.

Forming the evidence includes interjecting communication between a monitoring entity and one or more of the parties of the communication. For example, the interjected communication may include eliciting of confirmation or clarification information from the parties.

Storing the evidence in an immutable ledger includes storing information evidencing the existence of the evidence on a public distributed ledger. For example, the public distributed ledger comprises a blockchain.

The method further includes retrieving the evidence from the immutable ledger for a purpose of resolving a dispute related to the agreement.

Machine-implemented dispute assistance is provided to the parties, for example, including interacting with the user and a representative of the agent.

The dispute assistance includes providing an information retrieval service from the immutable ledger.

The dispute assistance includes one or more of: providing advice to at least one party of the plurality of parties; establishing communication between the user and/or the representative and a further party for the purpose of resolving a dispute; and answering questions received from at least one of the user and the representative related to the interaction among the parties.

In another aspect, in general, a machine-implemented system is configured to perform all the steps of any of the methods set forth above.

In another aspect, in general, a non-transitory machine-readable medium has instructions stored thereon, and the instructions when executed by a machine-implemented system cause said system to perform all the steps of any of the methods set forth above.

Other features and advantages of the invention are apparent from the following description, and from the claims.

DESCRIPTION

Figure 1:
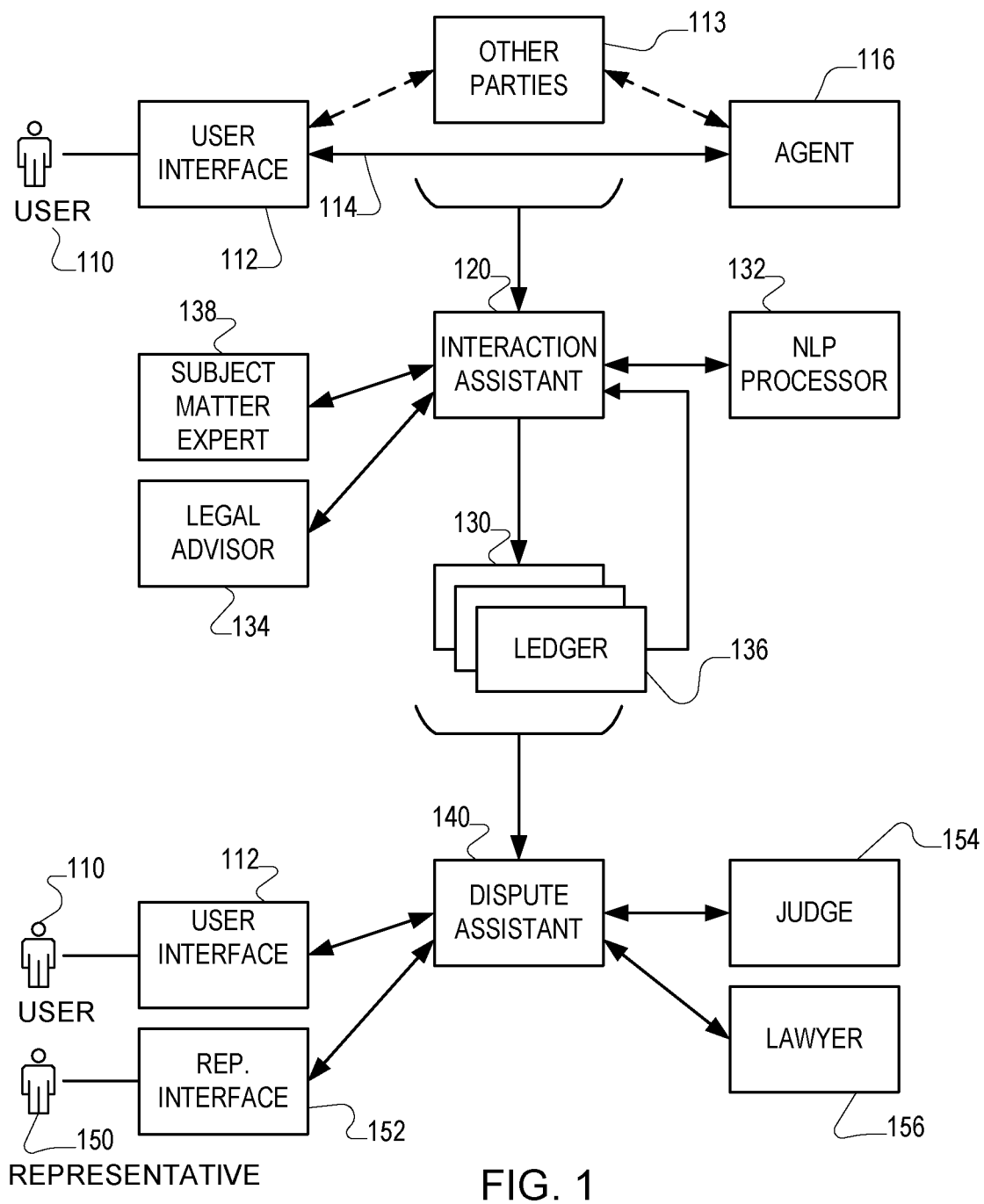
FIG. 1 is a block diagram of an evidence recording system.

Referring to FIG. 1, one or more embodiments makes use of a system structure that is illustrated. In this example, a user 110 interacts with a machine-implemented agent 116 (also referred to as an artificial intelligence (AI) agent, "AI agent", or simply the "agent"). For example, the user 110 interacts via a user interface 112 that passes communication between the user and the AI agent. For the sake of discussion, we refer to a "company" as controlling the agent (without any implication as to the nature of that controlling entity—it could be a government, another person etc.), so that essentially any agreements made in the interaction is between the user and the company. In some examples, the user interface 112 receives acoustic input (i.e., via a microphone), digitizes it, and passes it over a communication channel 114 to the agent 116. The agent processes the speech content from the user (e.g., using machine-implemented speech recognition and natural-language processing), and acts on it, generally providing acoustic feedback that is passed back over the channel 114 (e.g., using synthesized speech) and presented to the user 110 via the user interface 112. As a specific example, the user interface comprises a user's smartphone and the communication channel comprises a mobile telephone call circuit. In some examples, there may be one or more additional human or machine-implemented entities 113 that participate in the interaction.

The interaction between the user and the agent may not be simply transactional. For example, there may be a dialog in which the user makes inquiries, receives advice and recommendations from the agent, and may ultimately form the agreement. The agent may be both an advisor and a salesman. Therefore, the context of what led up to the agreement may be somewhat complicated, for example, with the user relying on the advice given by the agent, and the agent relying on information provided by the user. If there is ever a dispute regarding an agreement, the context may be important in resolving the dispute. For example, the agent may be providing travel advice as well as booking specific accommodations and transportation between locations. A future dispute may relate to a booking not having been made, but may also relate to why a particular type of booking was made in the context of the interaction that preceded the decision. For example, the user may have specified preferences for price, location, type etc., and the user relied on the agent following those preferences. A dispute may relate to whether those preferences were followed. Of course, these are only examples, but one can imagine that as artificial intelligent agent technology evolves, the complexity of the disputes that may arise will only increase.

During interaction between the user 110 and the agent 116, an interaction assistant 120 is associated with the communication and performs a number of functions related to the communication between the user and the AI agent. One function is to monitor the communication and extract evidence 122 related to the interaction. Very generally, the interaction assistant functions as a type of witness to the interaction. The interaction assistant may determine which are the portions of the interaction that relate to the formation of an agreement, and then forms evidence of the agreement from those portions. The evidence may comprise raw recording of the portions of the interaction and/or processed or interpreted information from such portions. The interaction assistant 120 passes this formed evidence 122 to a ledger 130, with retains a permanent immutable copy of the evidence. In some embodiments, this ledger is stored or otherwise makes use of the public Blockchain. Should there be a future dispute, this evidence would be available, and trusted to not have been tampered with, to support a resolution of the dispute.

In another function, the interaction assistant may record evidence related to the communication that goes beyond the context of the linguistic interaction. For example, the interaction assistant may determine the version number or other identifying information about the AI agent. Such information may, for example, establish the logic that is implemented by the AI agent. This information may be obtained in a variety of ways. For example, the interaction assistant may have a direct link to the AI agent (e.g., via an API) and can query the agent. In another example, the interaction assistant may extract such information from information passing over the communication channel during call setup. In another example, the assistant may have a machine-to-machine voice interaction with the AI agent to determine the information. The interaction assistant may similarly record evidence of the identity or other relevant characteristics of the user.

Continuing to refer to FIG. 1, the interaction assistant 120 may have private interactions with one or more other entities, and may facilitate direct interaction between the user 110 and/or the agent 116 and those entities. For example, the interaction assistant may bring in a human or machine-implemented subject matter (e.g., domain) expert 138, which may help resolve domain-specific issues. For example, the interaction assistant may connect to a real-estate transaction expert to determine the elements of a complete real estate transaction so that it can intervene if it determines that the user-agent transaction has omitted essential elements of the transaction. Similarly, the interaction assistant may put the user in direct communication with the expert 138, for example, by providing an introduction to the user and recommending to the user that they request help from the expert. Similarly, the interaction assistant may link to a human or machine-implemented legal advisor 134 for legal advice.

In some implementations, the interaction assistant 120 integrates natural language inprocessing of the direct interactions with the user and in interpreting the monitored interaction between the user and the agent. In some implementations, the assistant 120 links to an external natural language processor 132, which provides services in interpreting the interactions.

In addition to passive recordings or other evidence to the ledger 130, the interaction assistant may have access to past ledgers 136, for example, holding records of past interactions between the same user and agent. In such examples, the user may use the interaction assistant to query the past ledgers in a natural language question/answer mode, or the interaction assistant may autonomously access the past ledgers, for example, to identify inconsistences or to make suggestions (e.g., suggesting "in your last interaction, you agreed to X, are you sure you don't want to do that again?").

Various implementations of the interaction assistant are possible within the generic illustration of FIG. 1. As one example, the interaction assistant 120 may be controlled by the user, for example, being implemented as an application executing on the user's device (e.g., smartphone) that also hosts the user interface 112. Note that in this first example, the interaction assistant and the user may have a side interaction not known to the agent. As a simple example, the user may indicate to the interaction assistant that there has been an agreement to record.

As a second example, the interaction assistant 120 may be commonly controlled by the company controlling the agent 116, for example, being implemented as an application executing on a server co-located with a server that hosts the machine-implemented agent. Note that in this second example, the interaction assistant may have an advantage of being aware of the internal state of the agent. For example, an internal dialog control component of the agent may provide state or information extracted from the communication to the interaction assistant directly.

As yet a third example, the interaction assistant 120 is implemented as a service operated by a party that is distinct from the user or an entity controlling the agent, for example, being hosted in a "call bridge" or proxy that links the user, the agent, and the interaction assistant. As a fourth example, the interaction assistant may transparently tap into the conversation (assuming suitable permissions from the user and/or agent). Although the interaction assistant in FIG. 1 is shown monitoring the communication path 114 and the agent 116, it could equivalently monitor the acoustic path between the user and the user interface, for example, with a separate microphone in the user's environment that hears both the user and the agent's responses.

Beyond passively monitoring the interact between the user and the AI agent, the interaction assistant can intercede and become an active participant in the interaction between the user and the agent, somewhat as a mediator. In some examples, interactions between the interaction assistant and the user may be hidden from the agent (i.e., the agent doesn't hear the interaction) so that the side conversation is private. In some alternatives of such an example, the agent may in fact be a human agent and the interaction assistant may be the only artificial participant in the conversation. In such an example, the interaction assistant may explicitly request clarification from the user and/or the agent, for example, if it senses ambiguity or senses inconsistent understanding between the user and the agent. In this role, the interaction assistant may be considered to be actively adding to the body of evidence that will be associated with the interaction, and that will therefore be available to later resolve a dispute if necessary.

As introduced above, the interaction assistant may perform an advisory or "concierge" function to facilitate the interaction between the user and the agent, and in some such examples, may serve as a communication intermediary between the user and the agent.

Although there are numerous examples of how the interaction assistant 120 accesses the interaction between the user and the agent, unless otherwise specified below, in general, operation of the interaction assistant is insensitive to where the interaction assistant executes.

In implementations of the type shown in FIG. 1 in which the user communicates in a natural language (e.g., spoken English, typed text-message syntax), the interaction assistant 120 implements a natural language processing of the communication. In particular, it automatically determines one or more of the following:

1) A determination of whether the communication is about forming an agreement, as opposed, for example, for the purpose of obtaining information;
2) An importance/risk of the agreement, for example, an agreement to book a hotel room may embody greater risk than an agreement to order a pizza;
3) Extracted information characterizing an agreement, for example, a dollar amount and other aspects, for example, a hotel name and nights of a stay;
4) In cases where the monitor actively participates, eliciting clarification or confirmation information from the parties; and
5) Confidence that aspects 1)-4) have been correctly made.

Although a variety of techniques may be used for the natural language processing, one broad class of techniques makes use of annotated training material in which the outputs 1)-4) above are known, and a machine learning approach (e.g., using deep neural networks) is used in which settable parameters (e.g., neural network "weights") are set back on the training material, and then these parameters are used to process new monitored communication.

Should there later be a dispute between the user and a party on behalf of which the agent undertook the agreement, the evidence 132 is extracted from the ledger and passed to a dispute assistant 140, which may facilitate an interaction between the user 110 and a human or machine-implemented representative of the company 118. In some examples, the dispute assistant may link to additional entities, such as a judge 154, lawyer 156, mediator, arbitrator, and the like, to either provide services to the dispute assistant, or to facilitate direction communication between the user and/or representative and the additional entities. For example, the dispute assistant may provide evidence to a human judge, and answer questions from the judge, and the judge then considers the evidence to determine if the agreement was satisfied by the parties (i.e., the user and the party on behalf of whom the agent acted). The dispute assistant 140 can serve as a proxy witness that relies on the recorded evidence in the ledger 130 to inform the judge as to the specific history and context that led to the disputed situation. In some examples, the dispute assistant is also artificial-intelligence based, while in some examples, a human judge 154 may interact with a conversational artificial intelligence agent that responds to the judge to retrieve relevant evidence from the ledger.

The interaction assistant 120 may also determine contextual information related to the communication. Such contextual information may include a determined identifier or version of the agent 116, either determined from the content of the communication on the channel 114 or determined from a side channel (e.g., direct communication between the interaction assistant and the agent). Other contextual information may include date and time of day, an address or phone number used to access the agent. As an example, the version of the software implementing the agent may become significant in the future if it is determined that a particular version had a software defect ("bug") that caused it to make improper actions, for example, by misunderstanding the user's intentions.

Figure 2:
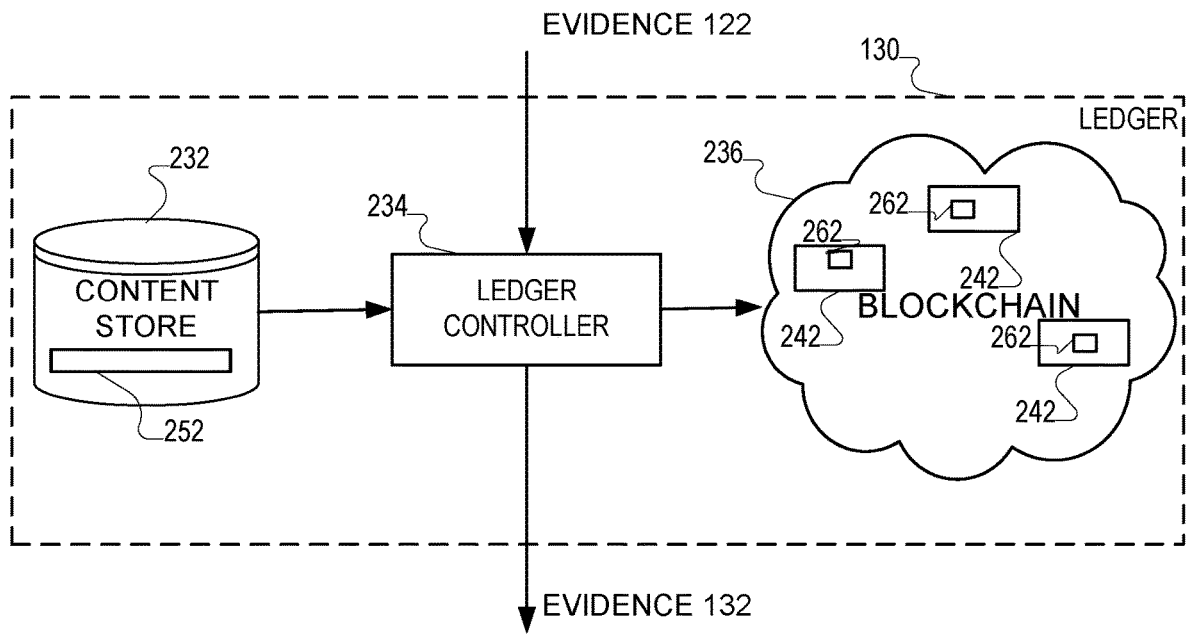
FIG. 2 is a block diagram of a blockchain based ledger.

Referring to FIG. 2, one implementation of the ledger 130 makes use of a blockchain 236. As introduced above, the blockchain is an example of an immutable ledger that can be used to prove the existence of previously formed transactions or other forms of records, generally including a time of the record (e.g., the time the record was created or was made permanent) and at least some data within the record. In the approach shown in FIG. 2, the entire evidence associated with an interaction is not necessarily stored in the blockchain. Rather, a ledger controller 234 receives the evidence 122 from the interaction assistant, and forms a digital record 252 for that evidence that it stores in a content store 232. In this example, the controller forms a cryptographic signature of the digital record (e.g., using a non-invertible function of the record, such as a hash function) and this signature is included in a record 262, which is distributed by the blockchain 236 to its multiple distributed copies of its internal ledger 242. The ledger controller maintains an index or has some other way of identifying the digital record 252 when evidence 132 is needed to be provided by the ledger 130. The evidence 132 provided by the ledger at the future date provides the authenticating information from the blockchain 236 to attest that the digital record is authentic and existed at the time of the interaction that is the subject of a dispute.

In some embodiments, the ledger 130 is configured to "forget" evidence, for example, based on a fixed schedule or based on the nature of the evidence recorded. Although the records 262 in the blockchain 236 cannot be expunged, the digital records 252 in the content store 232 can be deleted and made unavailable for future retrieval. There are other circumstances where the evidence may require deletion, for example, if it was improperly collected, or includes information that may not be collected or retained according to governing regulations (e.g., under the European GDPR regulations).

It should be recognized that not all embodiments require that full (e.g. voice) communication is recorded. For example, various codes, text (e.g., created from spoken conversations), text summaries, links to information, along with the more standard voice digitization, may all be stored in various amounts as needed.

The communication may be between or involve one or more people and one or more intelligent assistant(s). For example, with a person who may be using a phone or a smart device or smart speakers (e.g., like an Amazon Echo) interacting or conversing with an intelligent application such as a travel reservation bot. Alternatively, the interaction may be between two or more people, or between machines (e.g., AI to AI entity).

In some implementations, the user's device (i.e., the device hosting the user interface 112 of FIG. 1), which may be a phone, smart phone, smart speaker, robot, vehicle, autonomous vehicle, semi-autonomous vehicle, etc., may have a means for both control (e.g. a GUI) and indication (e.g. a colored illuminated region) related to the use of monitoring of interactions.

Figure 3:
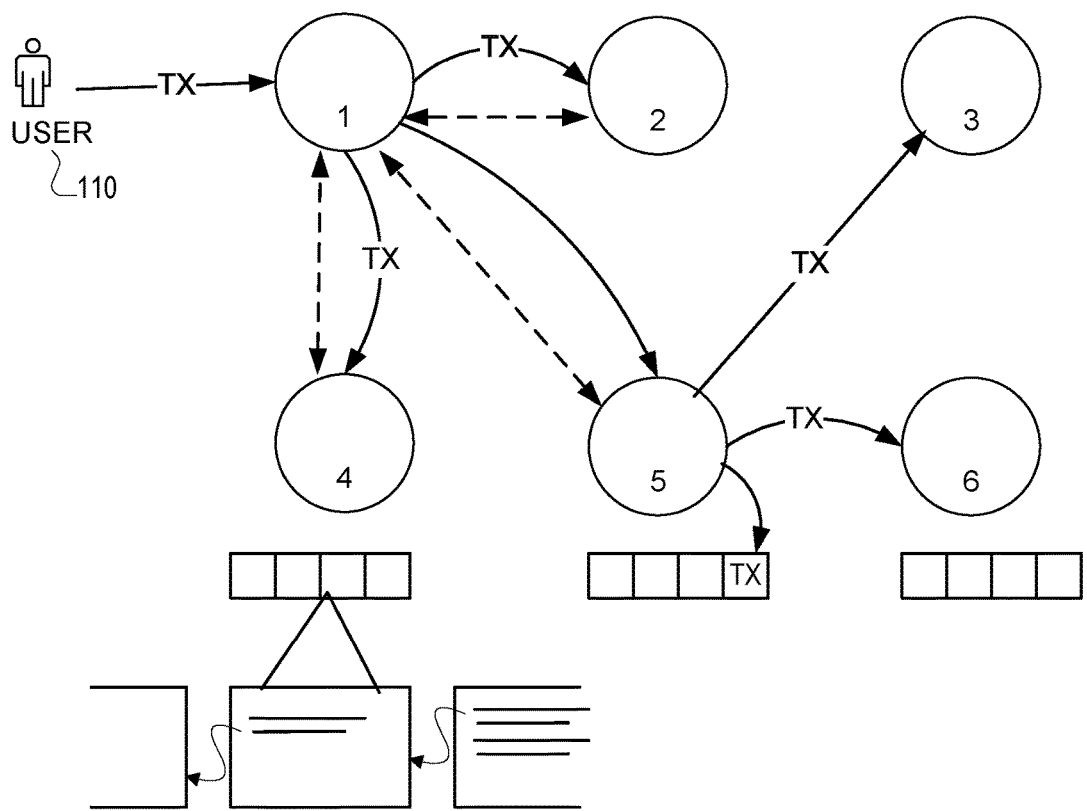
FIG. 3 is a system block diagram.

Referring to FIG. 3, in a particular implementation of the system, there are a number of different modules. Module 1 uses established policies along with automatic natural language understanding capabilities to determine if a given segment of the conversation is among the categories that the policy wants to store or not to store. Module 2 uses a probabilistic mechanism that has been trained to predict the risk (or otherwise called sensitivity) of the conversation segment to be needed as part of the dispute, i.e. would it be significant to any dispute or if it is altered would it affect the outcome of the dispute. Module 3 makes the determination to store a given segment in a blockchain fashion or simply record it based on user identity factor, user history, the group that user is associated with, and the clarity of the conversation due to noise and complexity of the discussion. Disputes usually are worth pursuing or protecting against if items of high value are involved. Module 4 implements that. Module 5 establishes a confidence level about how ambiguous the piece of conversation is. Module 6 establishes the criteria for blockchain storage based on physical and digital context such as location. One method of determining the topic of a communication is through latent semantic indexing of the spoken words or text, which is known in the enabling art.

Although described above in the context of linguistic communication (e.g., speech or text), recordings of user gestures, recordings of user facial expressions, recordings of user environment, the consideration of and inclusion of timestamps may also be recorded as evidence related to the interaction. In some examples, if the topic is automatically judged to be sensitive, the system may store more kinds of information to the ledger, such as the user's environment or gestures, and at faster rates.

In a particular use case example, the user may use the AI agent to purchase insurance (on behalf of one or more users) when the AI agent has determined it is likely to be useful to ameliorate risk, for example, when a risk level is elevated due to topic, words, emotion level, or even ambiguity due to words or noise in the background of a conversation. Emotion level could be estimated based on words spoken, voice prosody, and/or biometrics (when such information is available).

The communication device may include any of: smart phone, smart glasses, smart speakers, robots, robotic pets and companions, smart home, smart watch, augmented reality system, virtual reality system, 30 virtual world, game, smart wearable device, vehicle with a communications system, autonomous or semi-autonomous vehicle, drone (e.g. unmanned flying vehicle), or various forms of TV boxes (e.g. interface devices).

In examples in which the interaction assistant is an active participant in the interaction, it may determine that the interaction is not following an expected pattern. For example, if the interaction was expected to relate to travel planning, and a non-travel transaction is being made, the interaction assistant may provide real time feedback about potential risk of a conversation so that the participants become aware of the risk and agree on appropriate steps such as changing the conversation to be more aligned to the expected pattern.

In some examples where the interaction assistant has side-communication with the user, it may provide tactile or other non-linguistic feedback or to indicate to the user that the interaction assistant has recorded evidence of the communication in the immutable ledger. Also, the user may explicitly trigger the recording manually (e.g., via a GUI, gesture, spoken word, location, etc.), or the interaction assistant may trigger automatically (e.g., when the system determines a need for recording).

If desired, the interaction assistant may determine a location of a mobile computing device (phone, Amazon Echo, smart glasses, etc.) using one or more of a plurality of data sources and transmitting this information, along with video, to a remote storage system for persistent storage. Interesting mobile computing-device (or other device) information may include video/audio files, images, trace routes, location data, sensor data, and/or other appropriate data.

In some embodiments, the overall system may include a blockchain infrastructure and smart contracts to monetize transactions (e.g., using Bitcoin) in which our system is being used. This may also enable micropayments for use of the system, on a granular level. The implementation of block chain infrastructure for our purposes provides a new class of methods that enables the maintenance of interpretation of personal communications while giving access to actionable data and implementing a fair and transparent approach for users and judges, with the use of redundant distributed ledgers of transactions on peer-to-peer networks. For example, the system may receive payment for use in dispute resolution and/or recording the result of the dispute resolution.

The system may also record metadata on how a dispute regarding a communication was resolved (e.g., including whether a dispute was resolved according to both parties' satisfaction, when the dispute was resolved, emotion levels, etc.). Optionally, how related disputes have been solved may be indicated in the ledger.

In some alternatives, rather than using the ledger to help resolve a dispute, the user may use an assistant like the dispute assistant to access the ledger, for example to augment the user's memory. For example, this assistant may provide question answering capabilities based on the user's records in the ledger. For example, the user may wish to recall some set of negotiations, decisions, suggestions, recipes, guidance, and even feelings from a year ago, and the assistant aids in this process.

As introduced above, embodiments may be applied to voice-powered devices, including digital assistants. Such assistants are (and will be) available on a wide range of devices, from different manufacturers and in different form factors. Many such devices employ a voice layer utilizing different operating systems. Many companies develop and will develop voice-specific applications or associate existing applications and services with the platforms. Many manufacturers are also creating and will create smart displays (e.g. voice-activated speakers with screens on them). Such screens will facilitate additional interactions and opportunities for embodiments of this invention.

Such voice-based assistants communicate with other devices (for example, in a home or office building) as the end-user device cooperates with other devices, and the cloud. Such other devices may include a Home Hub platform and optionally make use of learning algorithms that can automate key tasks and help determine what features and settings to use in recording conversations as discussed herein.

In some embodiments, aspects of the system are monetized through advertising. For example, a user may be able to store information to a blockchain if he or she listens to, views, or interacts with an advertisement.

Although described in the context of voice communication, the system may also make use of speaking avatar platforms as a means of interaction (e.g. receiving and making certain requests, changing settings, receiving help, etc.) For example, such a richer agent capability may convey information with hidden emotional characteristics that could be considered misleading.

In some examples, the interaction assistant may store/record "inferences," or the nature or kind of inferences, associated with a user communication—that go beyond the ambiguous or chatty audio that is often part of conversations, dialogues, and linguistics. For example, the interaction assistant may record steps in reasoning, moving from premises to conclusions (and also include metadata associated with: a) deduction, b) induction, and c) abduction). In human-to-human interactions, a judge may, as a human participant, show how they arrived at a conclusion. In this system, the reasoning steps of the AI agent may be captured for future dispute resolution.

Deduction is logical inference from premises known or assumed to be true. Induction is inference from particular premises to a universal conclusion. Abduction is inference to the best explanation. Artificial intelligence inference engines sometimes apply rules to a knowledge base to deduce new information. Thus, the ledger may contain useful information on deduction, induction, and abduction steps that were employed, which may potentially be very useful in dispute resolution and other kinds of resolutions.

Note that unlike deductive arguments, inductive reasoning considers the possibility that the conclusion is false, even if all of the premises are true. Instead of being valid or invalid, inductive arguments may be either strong (S) or weak (W), which describes how probable it is that the conclusion is true. S and W information may be stored in the blockchain.

Regarding the discussion of reasoning methodologies and approaches, it is useful to note that in day-to-day interactions, people are generally taking an action that is based on a recommendation, a decision, a confirmation, and an explanation. Inductive reasoning, on the other hand, goes from a large number of examples to a theory that usually goes through a long process. For inductive reasoning to have a role in action taking, it generally goes through the following steps: 1) many observations leading to a conclusion or "theory" (inductive part), and 2) applying the theory to the specific case for a conclusion/confirmation (deductive part). In other words, for interactive systems, if an inductive reasoning takes place to create a theory, it generally needs to be followed by some deductive reasoning; that is, inductive reasoning alone will not be present in interactions unless it is followed by a deductive reasoning, adjacent in time or some interactions in the future. Note also that "inductive reasoning" is generally different than "proving by induction," which could also happen during a conversation. Of course, proving by induction may be considered as well.

When embodied in a system that relates to specific applications—for example, scenarios relating to contracts, terms, agreements, and conditions—the system may "listen" for certain keywords, conversational flows, or specific instructions by parties who are communicating, when such information may be relevant for such interactions. For example, consider that Bob, a book author, is chatting with Pam, a publisher, about a forthcoming book they plan on publishing. During informal or formal negotiations on a phone (or using digital assistant devices or by other communication means), such considerations may include one or more of: rights granted to the publisher, monetary advance, royalties on hardcover and paperback editions, subsidiary rights (split of money between author and publisher regarding foreign language publication, commercial adaptations, etc.), manuscript delivery date, publication date, or options for future works.

Other relevant applications may include: 1) HIPPA-compliant medical transcription using our blockchain system, 2) real estate transactions that are on-site with customers who wear smart watches or glasses that record aspects of the conversation and associate an image in a room with a comment that is also recorded on the blockchain, 3) conversations with financial advisors, 4) informal "bar bets"

between people who are "betting" on certain facts, figures, sports, outcomes and the like, etc.

Given that users will be employing dialogs and conversations with devices more in the future (e.g., as users speak to digital devices, interact with avatars in virtual worlds, or interact with devices in augmented reality settings), any aids for understanding complex communications and negotiations (e.g., retrieved from the past) will be helpful. Thus, the blockchain system described herein can help the user understand various communications from the past (which may relate to agreements and transactions between parties) through various means, depending on what is deemed to be helpful for a user or a cohort of users ("cohort" may refer to a class of user such as to physician users), the system can create and provide a compelling audiovisual narrative regarding a prior agreement or negotiation, using the content that was stored. By way of example, avatars may represent various involved parties. The system may apply various templates in showing, presenting, or outlining prior communications, and the system can build pie charts, other graphics, animations, audiovisuals, layouts of charts on a screen, dramatizations, and so forth in an attempt to make a transaction from the past more understandable to a user or different classes of users who may have different levels of sophistication. These enhanced narratives may improve through time as the system learns a user's preferences. For example, consider the case where a user is trying to recall a prior dispute or agreement with a company that has given a discount to a user based on terms and conditions. This dispute or agreement may have taken place many months in the past. Similarly, consider the case of a preliminary oral agreement between a publisher and an author regarding a planned book to publish. In some cases, the system may use, or learn to use, a chronological template or pattern that arranges or summarizes salient information, and the prior sequence of events, in a progression through time to help various parties understand and recall certain arrangements. The system may learn that some users may prefer an arrangement of information in one direction of time (forward) while another may prefer a backward arrangement. The system may slow down or pause, when certain important or difficult-to-understand passages are reached. In another template, a user may prefer to see a sequence of steps (e.g. like a flow chart, or an outline). Another template may show location, emotion, ambiguity and other factors that are highlighted (and the information may be sorted according to various features). Another template may control the audio expression of the agreements that are voiced to users, using different sound effects, pitches, voices, settings, etc. If a discussion in the past has taken many different branches, some of which led nowhere (e.g. did not proceed to an agreement of further development) while others came to a conclusion (e.g., because a complex discussion took place through time), then the system may display these branches like tributaries of a river, various graphics, annotation, text, icons, date tags, people tags, and the like.

The system may learn individual user preferences by many means, including user feedback, feedback from others, feedback from others in a cohort of users, feedback from judges or arbitrators (AI or human). If a certain pattern of parameters has led to a faster understanding by a user, then these parameters may be used or suggested in the future. For example, if a system learns that physicians can understand a dispute, on average, in 2 minutes when the system portrays a dramatization using avatars in a simulated physician's office, who pause at particular points in a playback, with some simulated office noise in the background to suggest the setting, then this pattern, or template, may be used or suggested in comparison to another pattern that requires, on average, a physician to spend 5 minutes, attempting to understand a past interaction.

The system may also assist with arbitration in various ways. For example, an AI agent may help resolve disputes outside the courts, in some cases, by acting as an "arbitrator," and more than one agent might participate in an "arbitral tribunal" that renders an "arbitration award." This arbitration award may be legally binding on both sides and enforceable in the courts. Also the arbitration module can be imposed either voluntarily or be mandatory and can be binding or non-binding. Of course, the system can also trigger the participation of human arbitral tribunals as well. The system can also play a role if there are also limited rights of review and appeal of the arbitration awards. These AI agents, judges, helpers, arbitrators, arbitral tribunals, etc. may employ natural language processing, chatbots, and other means of human-computer interaction.

The AI arbitral tribunal (e.g., employing more than one AI entity, each with such features as natural language processing, reasoning rules, and machine learning) may help to determine the outcome of a dispute. The composition of the AI arbitral tribunal can include AI entities from different companies, with or without an AI chairperson or umpire. Optionally, in some cases, an AI arbitrator may enjoy immunity from liability for anything done or omitted whilst acting as arbitrator unless the AI arbitrator has been programmed to act in bad faith.

When employing AI arbitral tribunals (employing more than one AI entity), the AI arbitral tribunals may be appointed by the parties (including companies) having a dispute or question. Also, the AI arbitral tribunals can be appointed by the end-users or by an AI-appointing authority chosen by the parties.

Embodiments of the approaches described above in detail may be implemented in software, with computer instructions being stored on non-transitory machine-readable media. These instructions, when executed by one or more processors implement the functions described above. The instructions may be at various levels, from machine-level instructions, to instructions for configuring an artificial-intelligence system.

It is to be understood that the foregoing description is intended to illustrate and not to limit the scope of the invention, which is defined by the scope of the appended claims. Other embodiments are within the scope of the following claims.

What is claimed is:

1. A method for machine-implemented assistance of interaction among a plurality of parties, the method comprising:
   monitoring, by a machine-learning interaction assistant, communication among the plurality of parties, the plurality of parties including a user and an agent different from the machine-learning interaction assistant, the communication including at least some part related to forming of an agreement between at least some of the plurality of parties;
   forming, by the machine-learning interaction assistant using a machine-implemented process, evidence of the agreement based on the monitoring of the communication, the evidence including portions of the monitored communications and context data generated, by the machine-learning interaction assistant to provide contextual information beyond the actual communication, the context data comprising one or more of: inferences and reasoning steps made by a trained machine-learning process regarding ambiguities in the monitored communication, or an internal state of the agent including data representative of logic implemented by the agent;

storing at least part of the formed evidence including the portions of the monitored communication and the context data as a digital record in a content store of a ledger;

forming, based on at least some of the formed evidence, a cryptographic evidence record; and storing the cryptographic evidence record in an immutable ledger of the ledger, the cryptographic evidence record being associated with the digital record through an index maintained by the ledger, the immutable ledger being different from the content store of the ledger, wherein the cryptographic evidence record is configured to authenticate the at least part of the formed evidence stored in the content store when subsequently retrieved for use in a future dispute resolution involving the agreement.

2. The method of claim 1 wherein forming the evidence comprises performing a natural language processing analysis of the communication to extract the evidence.

3. The method of claim 1 wherein forming the evidence includes using the machine-implemented process to perform one or more of the following:
   determining that the communication relates to forming the agreement;
   determining the part of the communication that relates to forming the agreement;
   determining a degree or importance or risk associated to the agreement;
   extracting information characterizing the agreement;
   eliciting clarification or confirmation information from the parties; and
   determining confidence of information determined or extracted from the communication.

4. The method of claim 1 wherein the communication is between a human user and a machine-implemented agent.

5. The method of claim 1 wherein the communication is between two human users.

6. The method of claim 1 wherein the monitoring and the forming of evidence is performed without interjection in the communication between the parties.

7. The method of claim 1 further comprising conducting a machine-implemented interaction between a monitoring entity and one or more of the plurality of parties, including one or more of:
   providing advice regarding the formation of the agreement to at least one party of the plurality of parties;
   establishing communication between the at least one party of the plurality of parties and a further party for the purpose of advising the at least one party of the plurality of parties regarding formation of the agreement; and
   answering questions regarding the formation of the agreement received from at least party of the plurality of parties related to the interaction among the plurality of parties or a prior related interaction.

8. The method of claim 1 wherein forming the evidence includes interjecting communication between a monitoring entity and one or more of the parties of the communication, including eliciting confirmation or clarification information from the parties.

9. The method of claim 1 wherein storing the evidence in an immutable ledger includes storing information evidencing the existence of the evidence on a public distributed ledger.

10. The method of claim 1 wherein the public distributed ledger comprises a blockchain.

11. The method of claim 1 further comprising:
    retrieving the evidence from the immutable ledger for a purpose of resolving a dispute related to the agreement.

12. The method of claim 1 further comprising:
    providing a machine-implemented dispute assistance including interacting with the user and a representative of the agent, the dispute assistance including providing an information retrieval service from the immutable ledger.

13. The method of claim 12 wherein the dispute assistance further includes one or more of:
    providing advice to at least one party of the plurality of parties;
    establishing communication between the user and/or the representative and a further party for the purpose of resolving a dispute; and
    answering questions received from at least one of the user and the representative related to the interaction among the parties.

14. A machine-implemented system comprising:
    one or more processing-based devices;
    memory storage device for storing computer instructions that, when executed on the one or more processing based devices, configure the machine-implemented system to provide assistance in an interaction among a plurality of parties, wherein providing assistance includes:
       monitoring, by a machine-learning interaction assistant, communication among the plurality of parties, the plurality of parties including a user and an agent different from the machine-learning interaction assistant, the communication including at least some part related to forming of an agreement between at least some of the plurality of parties;
       forming, by the machine-learning interaction assistant using a machine-implemented process, evidence of the agreement based on the monitoring of the communication, the evidence including context data generated, by the machine-learning interaction assistant, from the communication, to provide contextual information beyond the actual communication, the context data comprising one or more of: inferences and reasoning steps made by a trained machine-learning process regarding ambiguities in the monitored communication, or an internal state of the agent including data representative of logic implemented by the agent;
       storing at least part of the formed evidence including the portions of the monitored communication and the context data as a digital record in a content store of a ledger;
       forming, based on at least some of the formed evidence, a cryptographic evidence record; and
       storing the cryptographic evidence record in an immutable ledger of the ledger, the cryptographic evidence record being associated with the digital record through an index maintained by the ledger, the immutable ledger being different from the content store of the ledger, wherein the cryptographic evidence record is configured to authenticate the at least part of the formed evidence stored in the content store when subsequently retrieved for use in a future dispute resolution involving the agreement.

15. A non-transitory machine-readable medium having instructions stored thereon, wherein the instructions when executed by a machine-implemented system cause said system to provide assistance in an interaction among a plurality of parties, the providing of assistance including:
monitoring, by a machine-learning interaction assistant, communication among the plurality of parties, the plurality of parties including a user and an agent different from the machine-learning interaction assistant, the communication including at least some part related to forming of an agreement between at least some of the plurality of parties;
forming, by the machine-learning interaction assistant using a machine-implemented process, evidence of the agreement based on the monitoring of the communication, the evidence including context data generated, by the machine-learning interaction assistant, from the communication, to provide contextual information beyond the actual communication, the context data comprising one or more of: inferences and reasoning steps made by a trained machine-learning process regarding ambiguities in the monitored communication, or an internal state of the agent including data representative of logic implemented by the agent;
storing at least part of the formed evidence including the portions of the monitored communication and the context data as a digital record in a content store of a ledger;
forming, based on at least some of the formed evidence, a cryptographic evidence record; and
storing the cryptographic evidence in an immutable ledger of the ledger, the cryptographic evidence record being associated with the digital record through an index maintained by the ledger, the immutable ledger being different from the content store of the ledger, wherein the cryptographic evidence record is configured to authenticate the at least part of the formed evidence stored in the content store when subsequently retrieved for use in a future dispute resolution involving the agreement.

16. The method of claim 1, further comprising:
retrieving during a dispute resolution interaction the formed evidence and cryptographic evidence record; and
recovering from the retrieved and authenticated formed evidence, by a machine-implemented question answering system, items of evidence formatted as answers to questions made during the dispute resolution interaction regarding the forming of the agreement.

17. The method of claim 1, further comprising:
storing at least part of the formed evidence as a digital record in a content store different from the immutable ledger, wherein the cryptographic evidence record is associated with the digital record, with the cryptographic evidence record being configured to authenticate the digital record when the digital record is retrieved from the content store.

18. The method of claim 1, wherein forming the evidence, by the machine-learning interaction assistant, further comprises forming one or more of: a) interpreted contextual information, by the machine learning interaction assistant, based on the communication among the plurality of parties, about the interaction between the plurality of parties, or b) clarification data elicited from the user or agent, by the machine-learning interaction assistant, in response to determination of ambiguity or inconsistent understanding between the user and the agent.

19. A method for machine-implemented assistance of interaction among a plurality of parties, the method comprising:
monitoring, by a machine-learning interaction assistant, communication among the plurality of parties, the plurality of parties including a user and an agent different from the machine-learning interaction assistant, the communication including at least some part related to forming of an agreement between at least some of the plurality of parties;
forming, by the machine-learning interaction assistant using a machine-implemented process, evidence of the agreement based on the monitoring of the communication, the evidence including context data generated, by the machine-learning interaction assistant to provide contextual information beyond the actual communication;
forming, based on at least some of the formed evidence, a cryptographic evidence record; and
storing the cryptographic evidence record in an immutable ledger to authenticate the formed evidence for future retrieval;
wherein forming, by the machine-learning interaction assistant, the evidence of the agreement that includes the context data comprises:
determining, by the interaction assistant, an internal state of the agent, including data representative of logic implemented by the agent, wherein the agent is a machine-implemented agent.

20. The machine-implemented system of claim 14, wherein providing assistance further comprises:
retrieving during a dispute resolution interaction the formed evidence and cryptographic evidence record; and
recovering from the retrieved and authenticated formed evidence, by a machine-implemented question answering system, items of evidence formatted as answers to questions made during the dispute resolution interaction regarding the forming of the agreement.

21. The method of claim 1, wherein forming, by the machine-learning interaction assistant, the evidence of the agreement comprises:
identifying, by the machine learning interaction assistant, one or more portions of data, from the communication data, determined to be significant for resolution of a future dispute between the user and the agent;
and wherein forming, based on at least some of the formed evidence, the cryptographic evidence record comprises forming the cryptographic evidence record only for the identified one or more portions of the data representative of the communication determined to be significant for resolution of the future dispute between the user and the agent.

* * * * *